H. G. MILLAR.
METHOD OF PRODUCING CARBONATED BEVERAGES.
APPLICATION FILED MAY 26, 1910.
1,006,773.
Patented Oct. 24, 1911.
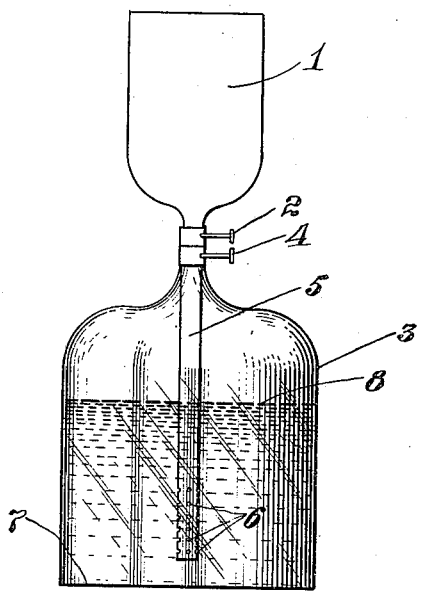
Attest:
Inventor:
Hugh Graham Millar
his Atty

UNITED STATES PATENT OFFICE.

HUGH GRAHAM MILLAR, OF NEW YORK, N. Y.

METHOD OF PRODUCING CARBONATED BEVERAGES.

1,006,773.

Specification of Letters Patent. Patented Oct. 24, 1911.

Application filed May 26, 1910. Serial No. 563,500.

*To all whom it may concern:*

Be it known that I, HUGH GRAHAM MILLAR, citizen of the United States of America, residing at New York city, in the county of New York and State of New York, have invented an Improved Method of Producing Carbonated Beverages, of which the following is a specification.

My invention relates to an improved method of charging saccharine or previously sweetened fluids, to produce carbonated saccharine beverages ready for shipment or consumption.

The primary object of my invention is to provide a method of charging saccharine fluids whereby I am enabled to produce carbonated, sweetened beverages, such beverages being adapted either for immediate use, or shipment to any desired distances, and from which a prepared, palatable, carbonated beverage may be drawn without foaming excessively when being dispensed.

A further object of the invention is to provide a method by which the precise relative quantities of ingredients which make up the beverage are predetermined and admixed at the place where the receptacles are filled, so that at the point of dispensing it is merely necessary to draw the desired quantity of completed beverage, thus obviating the necessity for reliance upon the skill of an operator to prepare a proper mixture.

The preferred method of practicing my invention consists in placing into a closed vessel a predetermined quantity of carbon dioxid and a predetermined quantity of syrup and thereafter mixing such syrup and carbon dioxid with a predetermined quantity of water in another receptacle. The receptacle last mentioned may be used to ship the beverage any desired distance and may also serve as the vessel from which the beverage is dispensed. Any means suitable for the purpose may be employed to obtain the desired results, and in the figure of the accompanying drawing I have shown an elevational view of the apparatus which, in practice, I have found is well adapted for carrying out the method.

In the drawing 1 designates a closed vessel, which is preferably made of cold rolled tin lined steel, tested to withstand approximately three thousand pounds pressure. This vessel is first filled, preferably entirely full, with a predetermined amount of syrup and a predetermined amount of carbon dioxid, the ingredients being introduced in the order named. The vessel 1 is provided with a cock 2 of suitable construction by means of which the outflow and inflow of the vessel 1 may be controlled. After the syrup and gas have sufficiently commingled in the vessel 1 they are permitted to pass to the vessel 3 (preferably of glass and provided with the cock 4) containing the requisite amount of plain water to form with the syrup and carbon dioxid the desired total quantity of carbonated saccharine beverage. The vessel 3 has approximately eighteen times the capacity of the vessel 1, and for the purpose of getting a satisfactory final beverage, a sufficient amount of carbon dioxid should be placed into the vessel 1 to charge the final fluid in vessel 3 to about three atmospheres pressures. Naturally different kinds of syrup will require varying amounts of gas, the quantity of gas being proportioned to the specific gravity of the syrup employed. As an example it may be stated that for two gallons of plain water in vessel 3 I use sixteen ounces of 27° B. syrup, then introduce sufficient carbon dioxid into vessel 1 to fill the space in the latter at approximately six hundred fifty pounds pressure. Then when the syrup and carbon dioxid mixture pass to 3 the contents of the latter will be carbonated at about 3 atmospheres.

When the beverage is desired for immediate use the receptacle 1 is agitated to more quickly produce an admixture of syrup and carbon dioxid, but if there is no haste the mixture takes place automatically by simply permitting the vessel 1 and its contents to stand the necessary length of time.

I preferably provide the vessel 3, in which the final beverage may be shipped and from which it may be dispensed, with a tube 5, having perforations 6 in a portion thereof and terminating somewhat short of the bottom 7 of the vessel 3. The purpose of the perforated tube is to cause the syrup and carbon dioxid mixture to enter the water in a plurality of small streams whereby all the ingredients will be well commingled. The water in the vessel 3 is filled up to about the point 8 and the space above this point represents approximately the space which the syrup and carbon dioxid occupy. When the syrup and carbon dioxid mixture in 1 is completed the vessels 1 and 3 are superposed as shown in the drawing, the cocks 2 and 4 being opened and the contents of 1 pass into 3 through the perforations 6 and if the beverage is desired for immediate use the vessel 3 is agitated, otherwise, it is simply permitted to stand until the mixture of the water, syrup and carbon dioxid has taken place automatically. If agitation of vessel 3 is resorted to the beverage will be ready for consumption in about ten minutes time, and if the vessel 3 is not agitated it will require about forty-eight hours for the mixture to take place.

I have found in practice that while I may employ carbon dioxid in either liquid or gaseous form, the liquid form enables me to determine with facility the precise amount to be used in proportion to the other ingredients which go to make up the beverage, and it may, therefore, be preferable to employ liquid carbon dioxid in some instances.

My invention enables me to charge the saccharine liquid at ordinary low temperature, ship it any desired distance and dispense the same in palatable form without excessive foam. In this manner beverages of uniform quality may be supplied to dealers and dispensed by them, thus not only improving the character of the beverage itself, but obviating the need for skilled operators in preparing beverages in accordance with existing practice.

Having thus described my invention what I claim as new and desire to secure by Letters Patent is:—

1. The herein described method of producing carbonated saccharine beverages, which consists in placing a predetermined quantity of syrup and a predetermined quantity of carbon dioxid in a closed vessel, placing a predetermined quantity of water in a second closed vessel, and finally passing the mixture of syrup and carbon dioxid from the first vessel into the second vessel without subjecting said mixture to atmospheric contact in its passage.

2. The herein described method of producing carbonated saccharine beverages, which consists in placing a predetermined quantity of syrup and a predetermined quantity of carbon dioxid in a closed vessel, placing a predetermined quantity of water in a second closed vessel, and finally passing the mixture of syrup and carbon dioxid from the first vessel into the second vessel through a perforated tube in the latter without subjecting said mixture to atmospheric contact in its passage.

3. The herein described method of producing carbonated, saccharine beverages, which consists in placing a predetermined quantity of syrup and a predetermined quantity of liquid carbon dioxid in a closed vessel, and thereafter passing the mixture so formed through a perforated tube into a second closed vessel containing a predetermined quantity of water.

4. The herein described method of producing carbonated, saccharine beverages, which consists in placing a predetermined quantity of syrup and a predetermined quantity of liquid carbon dioxid in a closed vessel, passing the mixture so formed through a perforated tube into a second closed vessel containing a predetermined quantity of water, and finally agitating said second vessel to produce a thorough admixture of its contents.

In testimony whereof I have affixed my signature in presence of two witnesses.

HUGH GRAHAM MILLAR.

Witnesses:
O. W. MUNK,
L. D. TRALEY.